United States Patent [19]
Takei et al.

[11] Patent Number: 4,739,391
[45] Date of Patent: Apr. 19, 1988

[54] VIDEO SIGNAL PROCESSING APPARATUS FOR CONVERTING LINE SEQUENTIAL SIGNALS INTO LINE SIMULTANEOUS SIGNALS

[75] Inventors: Masahiro Takei; Shigeo Yamagata, both of Kanagawa, Japan

[73] Assignee: Canon Kabushiki Kaisha, Tokyo, Japan

[21] Appl. No.: 758,497

[22] Filed: Jul. 24, 1985

[30] Foreign Application Priority Data

Jul. 25, 1984 [JP] Japan .................. 59-156220
Jul. 27, 1984 [JP] Japan .................. 59-156559
Jul. 27, 1984 [JP] Japan .................. 59-156560

[51] Int. Cl.⁴ .............................................. H04N 9/47
[52] U.S. Cl. ....................................... 358/18; 358/14
[58] Field of Search ................ 358/18, 313, 322, 324, 358/14

[56] References Cited

U.S. PATENT DOCUMENTS 3,162,838 12/1964 Sauvanet ........................... 358/14

FOREIGN PATENT DOCUMENTS

15225 4/1977 Japan .................... 358/18

Primary Examiner—John W. Shepperd
Attorney, Agent, or Firm—Toren, McGeady & Associates

[57] ABSTRACT

A video signal processing apparatus wherein the phase of a periodic signal the period of which relates to the horizontal scanning period of a video signal including line sequential signals with a discontinuous point at every predetermined period, is shifted at a timing according to a signal obtained by detecting the kind of information contained in the line sequential signals obtained within each horizontal scanning period; and a signal thus obtained by the phase shifting process is used for rearranging the line sequential signals into line simultaneous signals.

19 Claims, 12 Drawing Sheets

VIDEO SIGNAL PROCESSING APPARATUS FOR CONVERTING LINE SEQUENTIAL SIGNALS INTO LINE SIMULTANEOUS SIGNALS

BACKGROUND OF THE INVENTION

1. Field of the Invention

This invention relates to a video signal processing apparatus, and more particularly, to an apparatus arranged to process a video signal including line sequential signals with a discontinuous point at every predetermined period.

2. Description of the Prior Art

Generally, in rearranging line sequential signals into simultaneous signals, the kinds of the line sequential signals must be discriminated one from another for every horizontal scanning period (hereinafter referred to as an H period). Further, in recording or transmitting these signals, they are arranged in such a signal form that permits them to be discriminated from each other. For example, in recording signals of two different kinds in a line sequential manner, these line sequential signals have been arranged to have a DC component offset or a frequency offset at intervals of a 2 H period; or to have a flag signal added at intervals of the 2 H period. However, in reproducing the line sequential signals which have been arranged in this manner, it sometimes becomes impossible for a reproducing system to accurately discriminate the kinds of signals due to the adverse effect of a drop-out or a transmission distortion. This problem will be understood from the following description of a reproducing system, by way of example, wherein a one-field portion of a video signal, including line sequential color difference signals which have a DC offset as a discrimination signal at intervals of a 2 H period is continuously reproduced in the form of a still picture.

Figure 1:
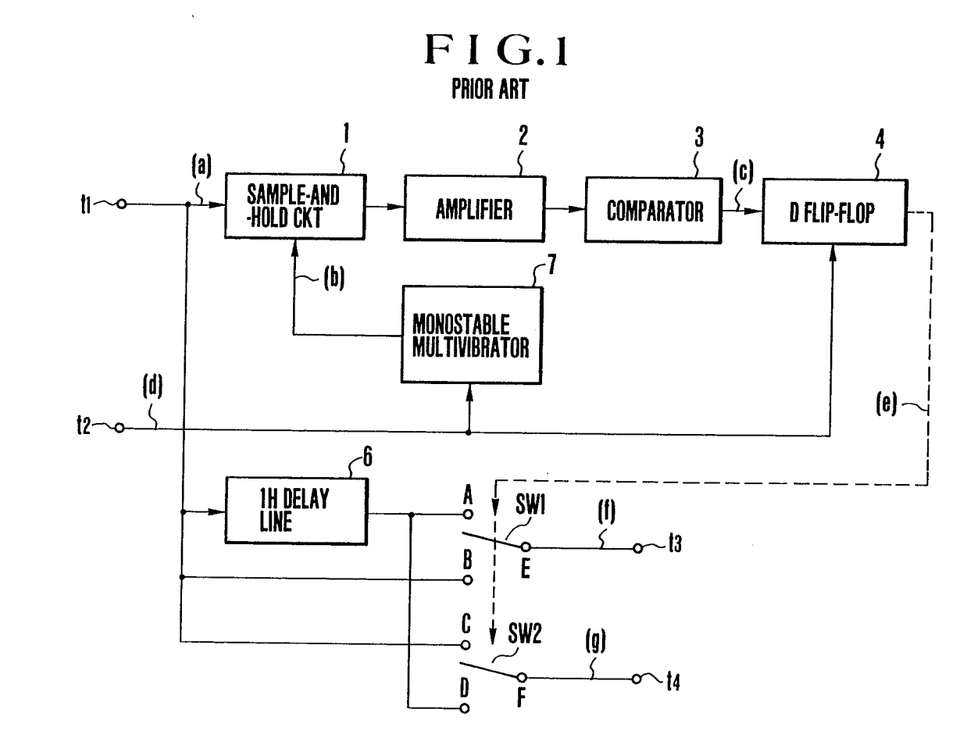
FIG. 1 is a block diagram showing the essential arrangement of the conventional video signal processing apparatus.
Figure 2:
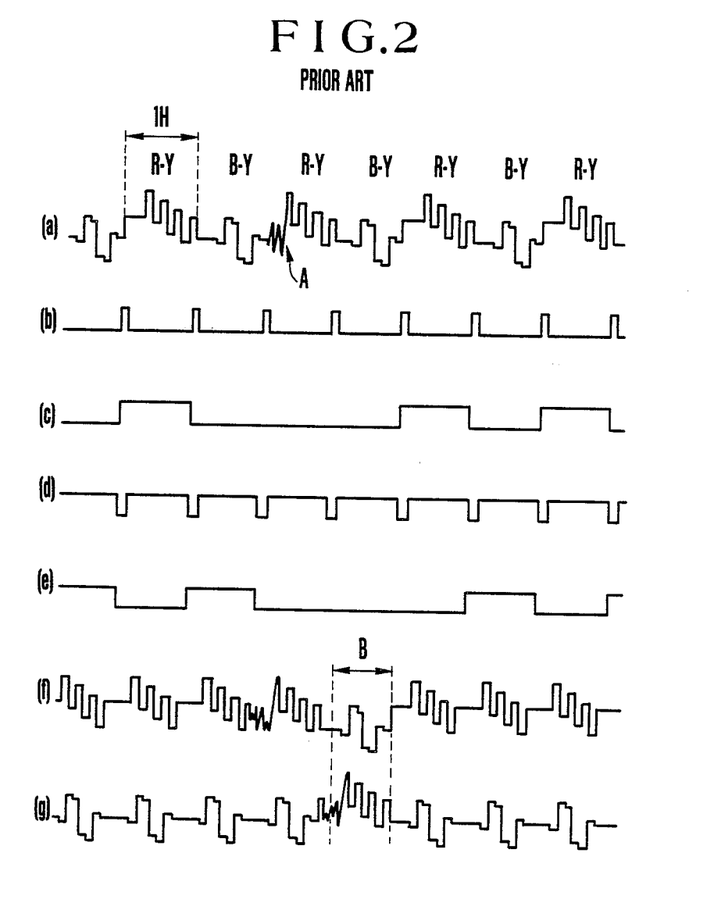
FIG. 2 is a waveform chart showing the waveforms of various parts indicated in FIG. 1.

FIG. 1 of the accompanying drawings shows, in a block diagram form the essential arrangement of the conventional reproducing apparatus of the above-stated kind. FIG. 2 is a waveform chart showing the waveforms of outputs obtained at the various points (a) to (g) indicated in FIG. 1. Referring to FIG. 1, a terminal t1 is arranged to receive line sequential color difference signals reproduced from a video signal. A terminal t2 is arranged to receive a horizontal synchronizing signal obtained from the reproduced video signal. The reproducing apparatus is provided with a sample-and-hold circuit 1; an amplifier 2 arranged to amplify the output of the sample-and-hold circuit 1; a comparator 3 arranged to compare the level of the output of the amplifier 2 with a predetermined level; a D type flip-flop (DFF) 4 arranged to receive the output of the comparator 3 as a data input and to be triggered by a fall in the horizontal synchronizing signal, which is indicated at (d) in FIG. 2; a delay line 6, the delay time of which is one horizontal scanning period (1 H=63.556 μsec); a monostable multivibrator 7 arranged to be triggered by the horizontal synchronizing signal (d) and to form a signal of a as shown at (b) in FIG. 2; and change-over switches SW1 and SW2. The contact piece E of the switch SW1 is connected to a contact point A and the contact piece F of the switch SW2 to a contact point C when the output signal of the DFF 4 is at a high level. The contact piece E of the switch SW1 is connected to the other contact point B and the contact piece F of the switch SW2 to the other contact point D of the switch SW2 when the output level of the DFF 4 is low. By this switching operation, the line sequential color difference signals are rearranged into line simultaneous color difference signals and are respectively supplied to terminals t3 and t4.

Let us assume that the line sequential color difference signals include a color difference signal R (red)−Y (luminance) and another color difference signal B (blue)−Y (luminance) and that the center level of the color difference signal R−Y is higher than that of the other signal B−Y and has been recorded in a line offset manner. Assuming that the signal R−Y is being reproduced during a certain H period, the signal which is sampled and held by the fall of the output signal (b) of the monostable multivibrator 7 during this H period is at a high level. Therefore, the output signal (e) of the DFF 4, produced during a next H period, is at a high level. More specifically, when the output of the 1 H delay line 6 is the signal R−Y, the contact piece E of the switch SW1 is connected to the contact point A to allow the signal R−Y, which has been rearranged into a simultaneous signal, to be produced from the terminal t3. Meanwhile, the signal B−Y, which has been likewise rearranged into a simultaneous signal, is allowed to be produced from the other terminal t4.

With the line sequential color difference signals arranged to be rearranged into line simultaneous color difference signals in the manner as described above, if there is some flaw, such as a poor S/N ratio due to a drop-out or the like, in the line sequential color difference signal reproduced at the time of sampling, it is no longer possible to obtain a result of the sample-and hold process with a correct DC offset. As a result of that, an error arises in the switching operation of the switches SW1 and SW2. Then, the signals R−Y and B−Y would be conversely rearranged. For example, deterioration in the S/N ratio due to a drop-out, indicated by an arrow A, causes a converse rearrangement during a period B, as shown in FIG. 2. This is highly disagreeable on a reproduced picture as it appears, for example, in the form of a red line in the event of a blue monochromatic picture. In the case of a still picture reproducing apparatus, in particular, the S/N ratio deterioration due to a drop-out or the like is apt to arise during the same H period to result in a very conspicuous disagreeable line.

SUMMARY OF THE INVENTION

It is a principal object of this invention to provide a video signal processing apparatus which is capable of solving the problem described above.

It is a more specific object of the invention to provide a video signal processing apparatus which is capable of correctly rearranging line sequential signals into line simultaneous signals even in the event of an extremely poor S/N ratio.

It is another object of the invention to provide a video signal processing apparatus which is capable of accurately rearranging, even in the neighborhood of a discontinuous point, line sequential signals, having a discontinuous point at intervals of a predetermined period, into line simultaneous signals.

Under this object, a video signal processing apparatus, arranged, according to this invention as a preferred embodiment thereof, to process video signals including line sequential signals which have a discontinuous point at intervals of a predetermined period comprises: means for generating a periodic signal having a period related to the horizontal scanning period of the video signals; shifting means for shifting the phase of the periodic signal generated by the generating means, the phase shifting action being performed in a cycle related to the predetermined period; detecting means for detecting the kind of information included in the line sequential signals obtained during each horizontal scanning period of the video signal; control means for controlling a timing for the phase shifting action of said phase shifting means on the basis of the output of the detecting means; and rearranging means for rearranging the line sequential signals into line simultaneous signals by a signal produced from the phase shifting means.

It is a further object of this invention to provide a video signal processing apparatus which is simultaneous signals, line sequential signals which have an extremely poor S/N ratio.

Under this object, a video signal processing apparatus, arranged, according to this invention as a preferred embodiment thereof, to process video signals including line sequential signals which have a discontinuous part at intervals of a predetermined period, comprises: generating means for generating a periodic signal having a period related to the horizontal scanning period of the video signal; phase shifting means for shifting the phase of the periodic signal generated by the generating means, the phase shifting action being performed in a cycle related to the predetermined period; detecting means for detecting the kind of information included in the line sequential signals obtained during each horizontal scanning period of the video signal; initial phase determining means for determining the initial phase of the periodic signal on the basis of the output of the kind of information detecting means; and rearranging means for rearranging the line sequential signals into line simultaneous signals by using a signal produced from the phase shifting means.

It is a further object of this invention to provide a video signal processing apparatus which is capable of accurately rearranging line sequential signals into line simultaneous signals without any error that continues over a short or long period error in the neighborhood of a discountinuous point included in the line sequential signals.

Under that object, a video signal processing apparatus, arranged, according to this invention as a preferred embodiment thereof, to process video signals including line sequential signals which have a discontinuous part at intervals of a predetermined period, comprises: first generating means for generating a first periodic signal having a period related to the horizontal scanning period of the video signal; second generating means for generating a second periodic signal having a period related to the predetermined period; designating means for designating specific periods by using the second periodic signal; detecting means for detecting the kind of information included in the line sequential signals obtained during each horizontal scanning period of the video signal; phase controlling means for controlling the phase of the first periodic signal on the basis of the output of the detecting means during the specific periods; and rearranging means for rearranging the line sequential signals into line simultaneous signals by using the first periodic signal the phase of which is controlled by the phase control means.

These and further objects and features of this invention will become apparent from the following detailed description of preferred embodiments thereof taken in connection with the accompanying drawings.

DETAILED DESCRIPTION OF THE PREFERRED EMBODIMENTS

In the embodiments described below, this invention is applied to still picture reproducing apparatuses of the kind mentioned in the foregoing. Before the description of these embodiments, a control signal necessary for the rearrangement of line sequential signals into simultaneous signals, is described as follows with reference to the timing chart of FIG. 3.

Figure 3:
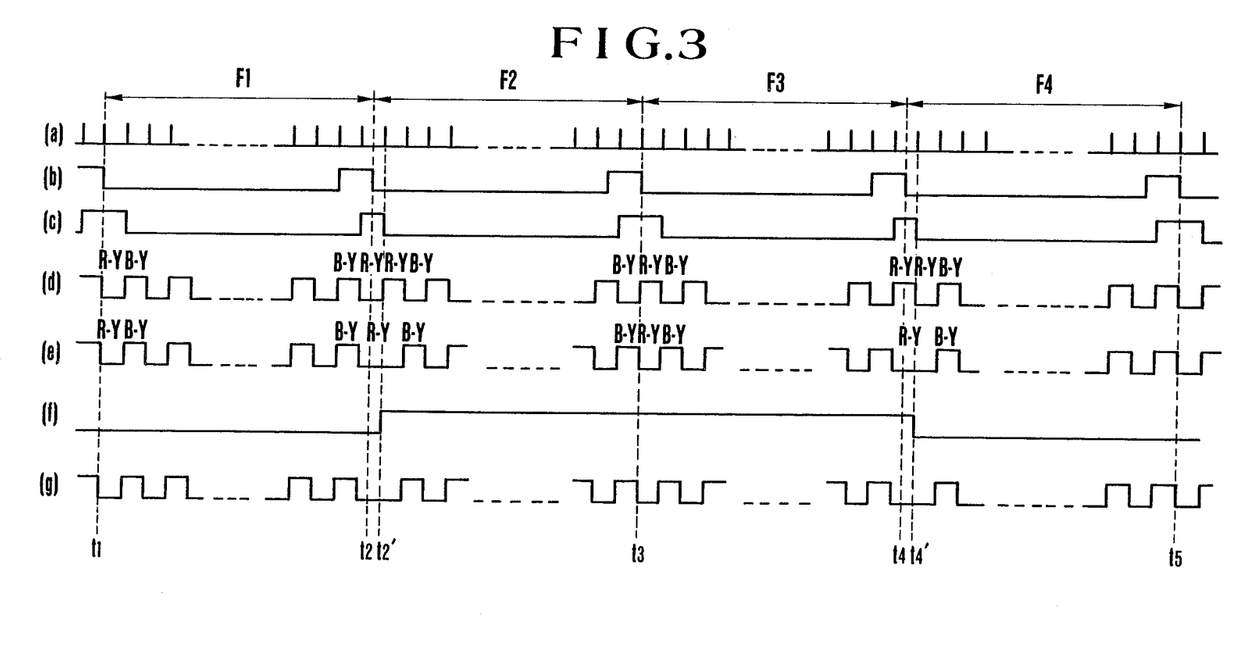
FIG. 3 is a timing chart showing the operation of an embodiment of this invention.

In FIG. 3, a part (a) represents a reproduced horizontal synchronizing signal. A part (b) shows a signal PG which is synchronized with the rotation of a magnetic sheet. The signal PG gives one pulse for one field. A part (c) shows a signal obtained by shaping the waveform of the signal PG (b) by means of the horrzontal synchronizing signal. A part (d) shows a timing signal which is obtained from the horizontal synchronizing signal (a) and is inverted for every H period. A part (e) shows a discrimination signal which is obtained by directly reading a discriminating or identification signal superimposed on reproduced line sequential signals and thus indicative of the kinds of line sequential signals. In FIG. 3, reference symbols F1 to F4 respectively represent field numbers. A boundary between the field F1 and another field F2 is ½ H skew corrected. As a result of this skew correction, the color difference signal R−Y is reproduced continuously over a 2 H period. At a point of time t2', the phases of the timing signal (d) and the discrimination signal (e) become opposite to each other. This condition lasts until a point of time t4' which is at the end of the field F3. At the point of time t4', again the timing signal (d) and the discrimination signal (e) becomes in-phase and one cycle of operation comes to an end at a point of time t5.

In this example, the timing signal (d), which is free running for switching, and the discrimination signal (e), which is for direct reading, are anti-phase relative to each other during a two-field period from the point of time t2' to the point of time t4' and are in phase during other two-field periods. In order to make the phases of the timing signal (d) and the discriminatron signal (e) coincide with each other, a timing signal (f) is formed by using the signal PG (b) in such a way as to invert the timing signal (f) every 2-frame period, and the phase of the timing signal (d) is inverted while the timing signal (f) is at a high level. By this arrangement, a switching control signal (g), which is completely in phase with the discrimination signal (e) can be obtained as shown in FIG. 3.

Figure 4:
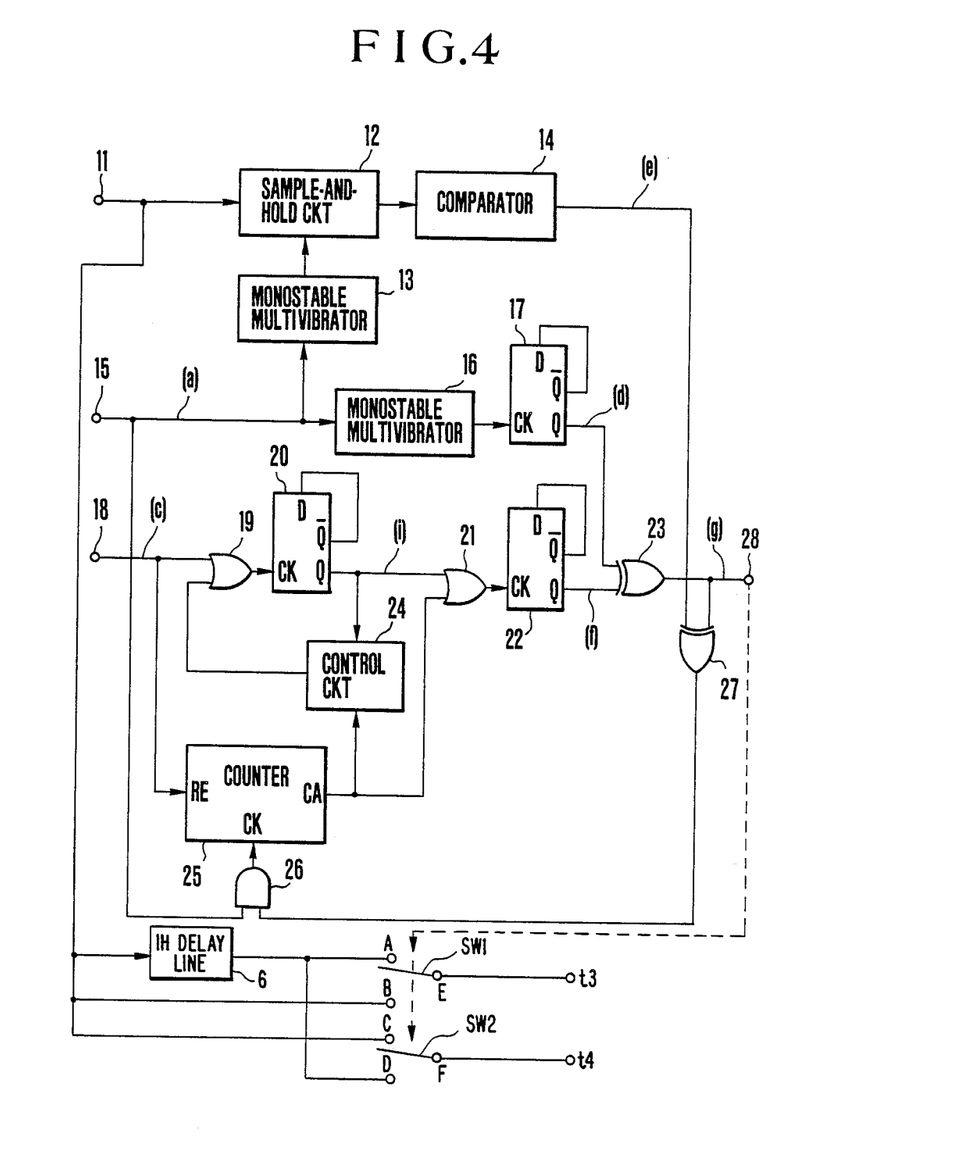
FIG. 4 is a block diagram showing the essential arrangement of a video signal processing apparatus arranged according to this invention as an embodiment thereof.

FIG. 4 shows, in block diagram form, an example of a circuit arrangement for obtaining the above-stated timing signal (f) and the switching control signal (g). Referring to FIG. 4, line sequential color difference signals are supplied from from a terminal 11 and are applied to a sample-and-hold circuit 12. At the circuit 12, a reproduced horizontal synchronizing signal (a), which is supplied via a terminal 15 and is delayed for a predetermined length of time by a monostable multivibrator 13, is used for sampling the above-stated line sequential identifying signals. The level difference of the sampled signals is detected by a comparator 14 and the discrimination signal (e) is formed. The horizontal synchronizing signal (a), which comes via the terminal 15, is supplied via another monostable multivibrator 16 to an inversion circuit 17 which consists of a D flip-flop. The inversion circuit 17 then forms the timing signal (d) which is inverted every 1 H period. Another terminal 18 is arranged to receive the signal (c) which has been synchronized with the signal PG (b). The signal (c) is supplied to an OR circuit 19 and also to the reset terminal RE of a counter 25. The output of the OR circuit 19 is supplied to another inversion circuit 20 which consists of a D flip-flop. The circuit 20 forms a signal (i) is inverted every 1-field period. The a signal (i) is supplied, via an OR circuit 21, to a further inversion circuit 22 which consists of a D flip-flop. The circuit 22 forms the timing signal (f) which is inverted every 2-field period. Both the timing signals (d) and (f) are supplied to an exclusive OR circuit 23. The output of the exclusive OR circuit 23 becomes the control signal (g) which is used for line reshuffling or switching. The line switching signal (g) is guided also to another exclusive OR circuit 27. The output of the exclusive OR circuit 27 is supplied to an AND circuit 26 together with the horizontal synchronizing signal (a). The output of the AND circuit 26 is supplied to the clock input terminal CK of the counter 25. Upon completion of counting a predetermined number of clock pulses supplied from the AND circuit 26, the counter 25 produces a carry-out signal which is supplied to a control circuit 24 and also to the other input terminal of the OR circuit 21. Meanwhile, to another input terminal of the control circuit 24 is supplied the Q-output (i) of the inversion circuit 20. The control circuit 24 then produces, on the basis of these two inputs, a signal, which is supplied to the other input terminal of the OR circuit 19. The operation and waveforms of the arrangement shown in the block diagram of FIG. 4 are as shown in timing charts of FIGS. 5 and 6.

Figure 5:
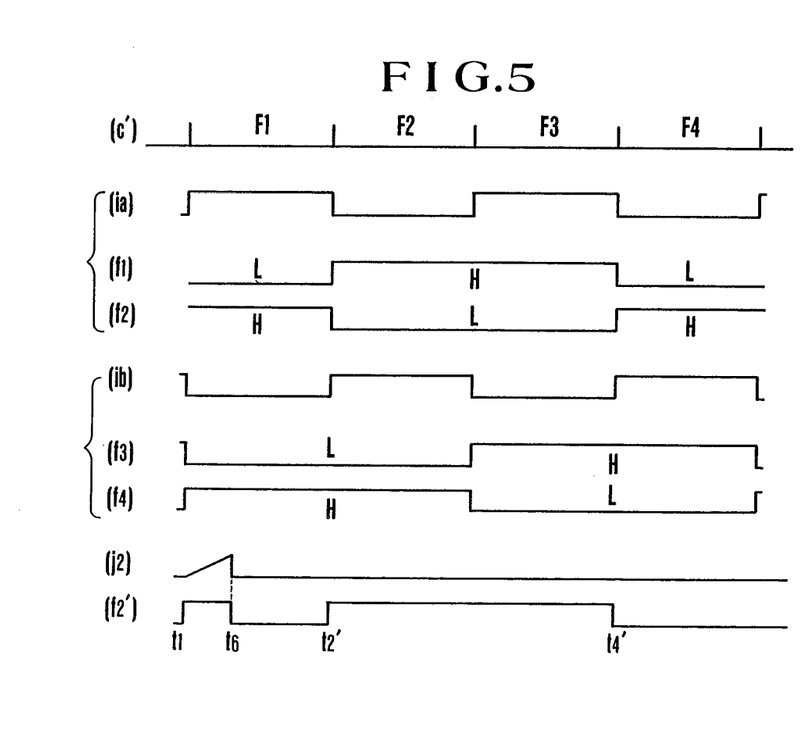
FIGS. 5 and 6 are timing charts showing the waveforms of various parts of FIG. 4.
Figure 6:
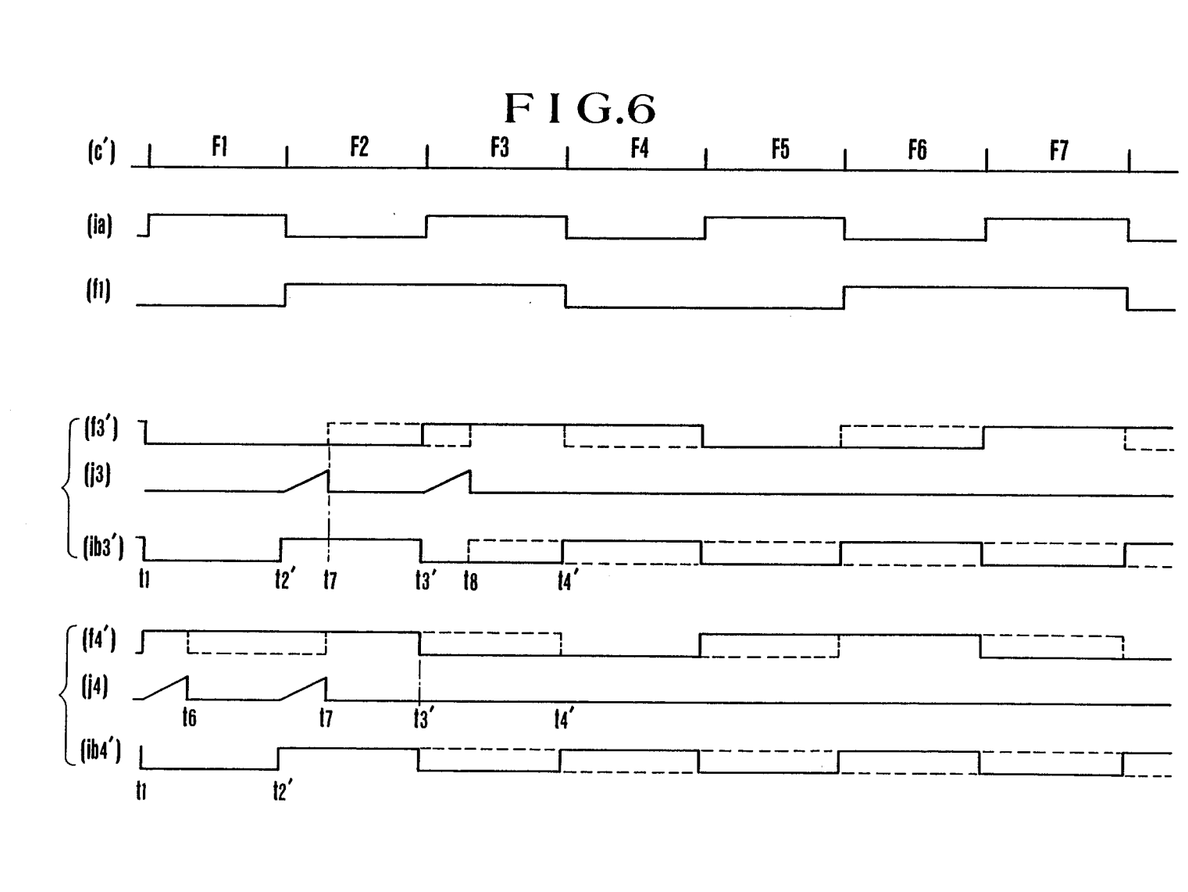

Referring to FIG. 5, a part (c') shows the rear part of the signal (c) of FIG. 3. Parts (ia) and (ib) show output waveforms of the inversion circuit 20 which are of opposite phases. Parts (f1) and (f2) show the output waveforms of the inversion circuit 22 which are produced following the output (ia). Parts (f3) and (f4) show the output waveforms of the inversion circuit 22 which are produced following the output (ib), respectively. If the output waveform (f1), which is shown in FIGS. 5 and 6, represents a phase inverting timing signal to be obtained from the inversion circuit 22, all the outputs (f2), (f3) and (f4) become erroneous phase inverting timing signals.

If there is a phase difference between the direct reading discrimination signal (e) and the switching control signal (g) produced from the exclusive OR circuit 23, the exclusive OR circuit 27 produces a signal which remains at a high level as long as the phase difference continues. During this period, the horizontal scanning signal is obtained as the output signal of the AND circuit 26. The counter 25 then counts the horizontal synchronizing periods. When the count reaches a predetermined number, that is, when the phase of the switching control signal (g) is determined to be different, the counter 25 produces a carry-out signal, which inverts the output of the inversion circuit 22. In FIG. 5, parts (j2) and (f2') show a correcting operation when the combination of the outputs of two inversion circuits 20 and 22 is (ia)—(f2). The output (j2) represents the count value within the counter 25. The phase difference causes the count value of the counter 25 to rise from a point of time t1. The carry-out signal is produced at a point of time t6.

Then, at the same time as this, the level of the output (f2') changes from a high level to a low level. At a point of time t2', the fall of the output (ia) causes the output (f2') to again become a high level. After that, the output (f2') comes to have a correct phase which is equal to that of the phase inverting timing signal (f1).

The phase correcting operation in the cases of combinations (ib)—(f3) and (ib)—(f4) is as follows: FIG. 6. shows this operation. As mentioned above, a timing signal (ia)—(f1) has a correct phase. At parts (f3'), (j3) and (ib3'), full lines indicate waveforms obtained without phase correction while broken lines indicate waveforms obtained with phase correction carried out in accordance with the arrangement of this embodiment. Other parts (f4'), (j4) and (ib4') also have full lines and broken lines used in the same manner.

Referring first to the parts (f3'), (j3) and (ib3'), the discrimination signal (e) and the control signal (g) are in-phase during a period between points of time t1 and t2'. Therefore, the counter 25 does not count unless there is some error due to a drop-out or the like. During a period between points of time t2' and t7, there is a phase difference between the signals (e) and (g) and, therefore, the counter 25 performs a counting operation. At the point of time t7, the carry-out signal is produced to change the output (f3') to a high level. At a next point of time t3', the level of the output (ib3') changes to a low level. This causes the level of the output (f3') to become a low level. Thus, at this point of time, there arises a phase difference between the signals (e) and (g) and the counter 25 begins to count. At a point of time t8, the carry-out signal is produced. At this instant, if the output (ib3') is at a low level, the output (ib3') is controlled to become a high level. Then, since the output (f3') has also become a high level at that point of time, a timing signal of a correct phase becomes available at a point of time t4'.

In the case of the latter group of outputs (f4'), (j4) and (ib4'), since there exists a phase difference between the signals (e) and (g) from the point of time t1, the counter 25 performs a counting operation from the point of time t1. At the time t6, the carry-out signal is produced from the counter 25 to make the level of the output (f4') low. At the time t2', the counter 25 again begins to count. At the time t7, the level of the output (f4') becomes a high level. In this instance, if the output (ib4') is immediately inverted, the output (f') would be also inverted. To avoid this, the output (ib4') is arranged to be inverted at the point of time t3' which is a next timing defined by the signal PG. Through this series of control processes, a timing signal of a correct phase becomes available after the point of time t3'.

Figure 7:
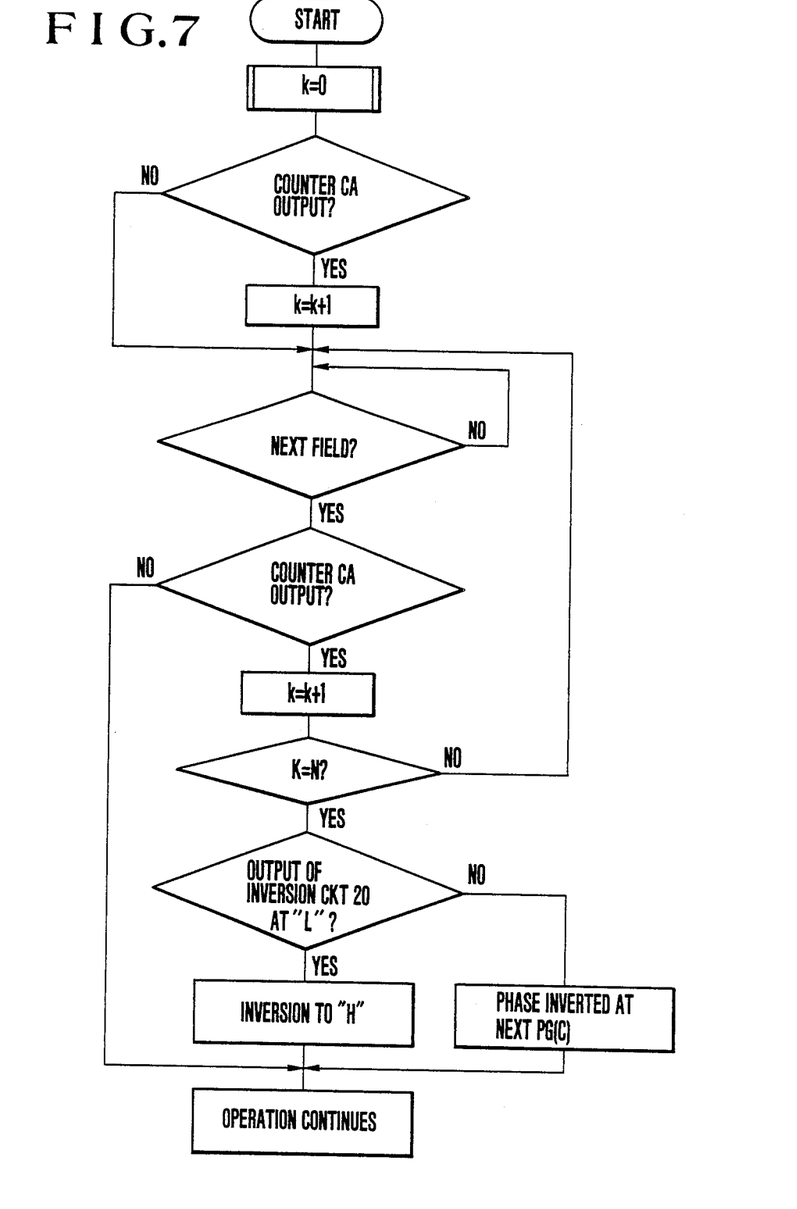
FIG. 7 is a flow chart showing the operation algorithm of the control circuit shown in FIG. 4.

FIG. 7 is a flow chart showing the algorithm of the operation of the control circuit 24. The conditions for the start of the operation include that the rotation of the motor is stable. A reference symbol k denotes the number of the carry-out signals of the counter 25. It is checked for the carry-out signal at the first field and again at a next field. In case of no carry-out signal for two consective fields, that is, in case of a correct phase from the beginning or in the case of the part (f1) and also in case that there is no carry-out signal in the next field ensuing a first field which has a carry-out signal, that is, in the case of the part (f2), the phase of the output of the inversion circuit 20 requires no correction and the operation can be furthered. Whereas, in the event of a carry-out signal output in the next field following the first field which has had a carry-out output, there obtains a condition of N=2. In that event, as mentioned in the foregoing description, an inverting control operation is performed on the phase of the signal produced from the inversion circuit 20 depending on whether the output signal level is high or low.

In the embodiment described above, the output of the counter 25 is used only for first several fields. After that, the phase control over the control signal (g) for rearrangement into simultaneous signals is performed by means of a timing signal which is obtained, respectively, from the signal PG (b) and the horizontal synchronizing signal. The invented arrangement permits simplification of the structural arrangement of the apparatus and yet enables the apparatus to accurately rearrange line sequential signals into line simultaneous signals even in the event of line sequential signals of a poor S/N ratio.

Figure 8:
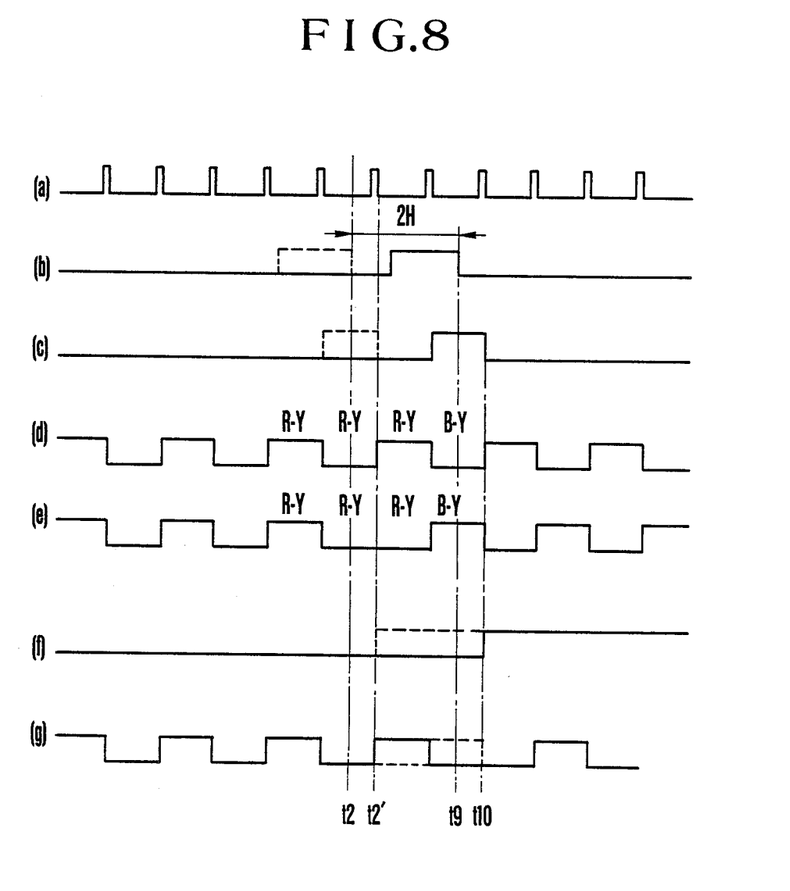
FIG. 8 is a timing chart showing the influence of deviation of a signal PG.

In case that the phase discontinuous point of the switching control signal and the timing of the signal PG do not perfectly coincide with each other, there arises the followrng problem when the apparatus is interchanged with another apparatus, though such discrepancy does not present a large problem as long as the same apparatus is used for recording and reproduction: Due to a difference in the characteristic of the detector arranged to detect the rotation of the magnetic sheet, a timing deviation resulting from an error in the mounting porition of the detector, a PG deviation on a recording track located in a larger diameter position resulting from rotation servo arrangement of a PG pin positioned at a smaller diameter point on the magnetic sheet, inconstant relative positions between the PG detector and the recording/reproducing head, etc., the phase of the control signal comes to be reversed in the neighborhood of the phase disontinuous point. FIG. 8 shows the erroneous operation of the switching control signal due to such a timing deviation of the signal PG.

Referring to FIG. 8, full lines indicate wave-forms obtained with the signal PG having the above-stated deviation. Broken lines show waveforms obtained when the signal PG is not deviating. As shown, during a period between points of time t2' and t10, the phase of the switching control signal (g) is inverted from the correct phase thereof. This causes a switching error in carrying out the operation of rearranging the line sequential signals into simultaneous signals.

Figure 9:
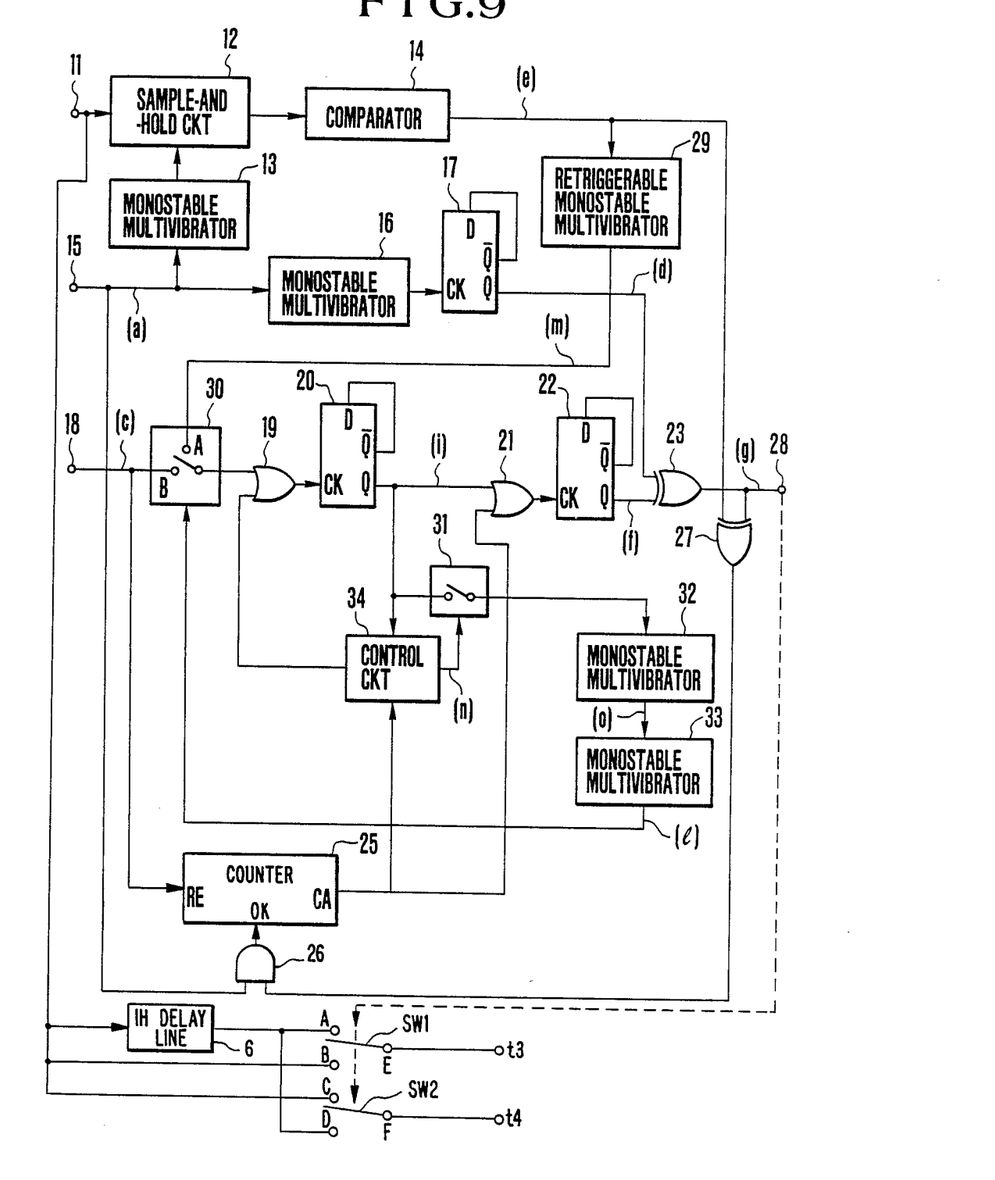
FIG. 9 is a block diagram showing the essential arrangement of another embodiment of this invention.
Figure 10:
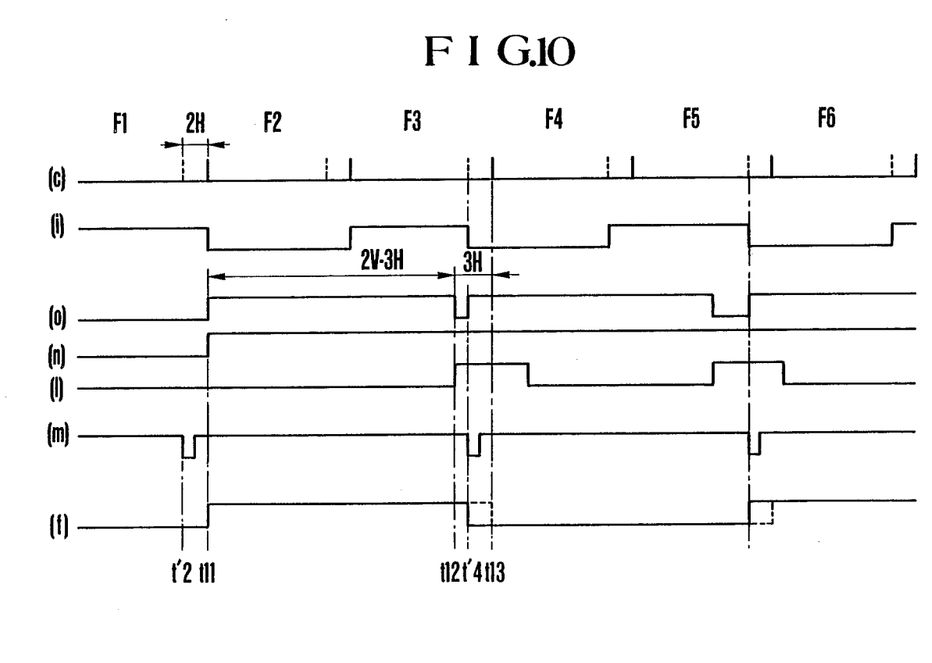
FIG. 10 is a timing chart showing the operation of the apparatus of FIG. 9.

FIG. 9 shows, in block diagram form, the essential parts of an apparatus which embodies the above described concept of this invention as another embodiment thereof. FIG. 10 is a waveform chart showing the operation of the embodiment shown in FIG. 9. In FIGS. 9 and 10, the same reference numerals and symbols are used for denoting the same elements and parts performing the same functions as those shown in FIGS. 4 and 5. In the same manner as in the case of FIG. 4, the discrimination signal (e), which is produced from the comparator 14, is supplied to the exclusive OR circuit 27 and is also supplied to a retriggerable monostable multivibrator 29. In this case, the output of the multivibrator 29 is arranged to have an unstable period which is a little longer than a 1 H period and the switching signal is not inverted for a period which is longer than the horizontal synchronizing period. In other words, after arrival of a phase discontinuous point, the output of the monostable multivibrator 29 remains at a low level. This signal (m) is supplied to the terminal A of a switch circuit 30. Meanwhile, a signal obtained from the signal PG is supplied from the terminal 18 to the counter 25 and to the terminal B of the switch circuit 30. The output of the switch circuit 30 is supplied, via the OR circuit 19, to the inversion circuit 20. The Q output (i) of the inversion circuit 20 is supplied to the OR circuit 21, a control circuit 34 and a switch circuit 31. The output of the switch circuit 31 is supplied to a monostable multivibrator 32 which has an unstable period for a length of time (2 fields−3 H). The output (o) of the monostable multivibrator 32 is supplied to a monostable multivibrator 33. Then, the monostable multivibrator 33 forms a gate signal (l) which lasts for a 6 H period. The length of time "3 H" is mentioned above, by way of example, and may be changed to any length of time that exceeds the absolute fluctuation value of the signal PG. The gate signal (l) is arranged to control the switch circuit 30 in the following manner: The connecting position of the switch circuit 30 is shifted to the terminal B when the gate signal is at a low level and to the other terminal A when the gate signal is at a high level. The control circuit 34 is arranged to operate almost in the same manner as the control circuit 24 shown in FIG. 4. In this case, the control circuit 34 detects that the signals (i) and (f) have correct phases; after detection of correct phases, it renders monostable multivibrators 32 and 33 operative by turning the switch circuit 31 on.

Referring to FIG. 10, a part (c) shows pulses obtained from the horizontal signal and the signal PG. Broken lines indicate these pulses when they are at correct timing. If the phases of the signals (i) and (f) are correct for a field F1, the monostable multivibrator 32 enters an unstable period upon arrival of a next pulse (c) at a point of time t11. Then, after the lapse of a period of time (2v−3 H), the other monostable multivibrator 33 comes to produce a high level output at a point of time t12 over a 6 H period. During this period, the connecting position of the switch 30 is shifted to the terminal A. Therefore, at a discontinuous phase point t4' of the switching signal, the output (m) of the retriggerable monostable multivibrator 29 falls. At the same time, the signal (i) is inverted and again the monostable multivibrator 32 enters a unstable period. After that, the phase switching operation on the outputs of the inversion circuits 20 and 22 is controlled according to the discontinuous point as observed through the identification signal superimposed on the line sequential signals. Therefore, despite the deviation of the signal PG, the switching control signal (g) can be accurately obtained for rearrangement of the line sequential signals into line simultaneous signals.

The absence of the horizontal synchronizing signal resulting from an uneven rotation at the phase discontinuous point of the line sequence switching control signal, i.e. at a joint between the starting and ending points of a circular recording track, brings about various problems: Detection of the discrimination signal becomes impossible; and, with this joint corresponding to the starting and ending points of a recording gate signal, a switching noise of the gate is superimposed to degrade the S/N ratio. In other words, in the neighborhood of the point in question, say, a ±3 H period relative to this point, it becomes either impossible to detect the phase discontinuous point of the switching signal by directly detecting a superimposed discrimination signal, or a plurality of discontinuous points might be detected instead of one. Under such a condition, the phase of the self-running switching signal either cannot be inverted or would be again reversed after inversion. It is therefore, nearly impossible to obtain a normal line sequence switching signal under that condition. These problems are solved by another embodiment of this invention which is arranged as described below.

Figure 11:
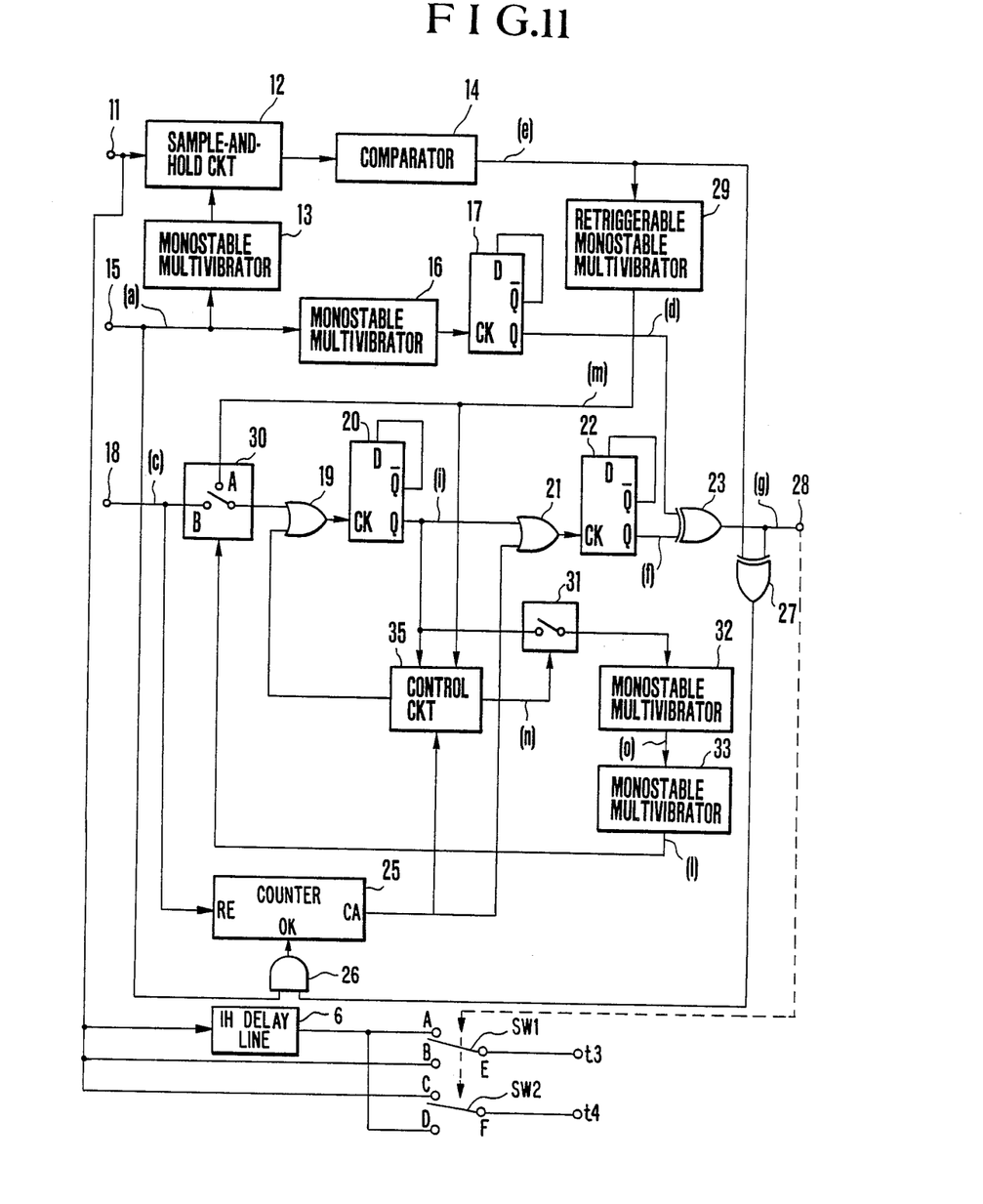
FIG. 11 is a block diagram showing the essential arrangement of a further embodiment of this invention.

FIG. 11 shows in a block diagram the essential arrangement of the above stated embodiment. In FIG. 11, the parts indicated by the same reference numerals as those shown in FIG. 9 perform similar functions. The embodiment includes a control circuit 35 which is arranged in about the same manner as the control circuit 34 of the preceding embodiment. However, to directly detect whether there is a discontinuous point from the discrimination signal, the output of the retriggerable monostable multivibrator 29 is also supplied to the control circuit 35. With the exception of that arrangement, the embodiment is identical with the preceding embodiment and thus requires no further description here.

Figure 12:
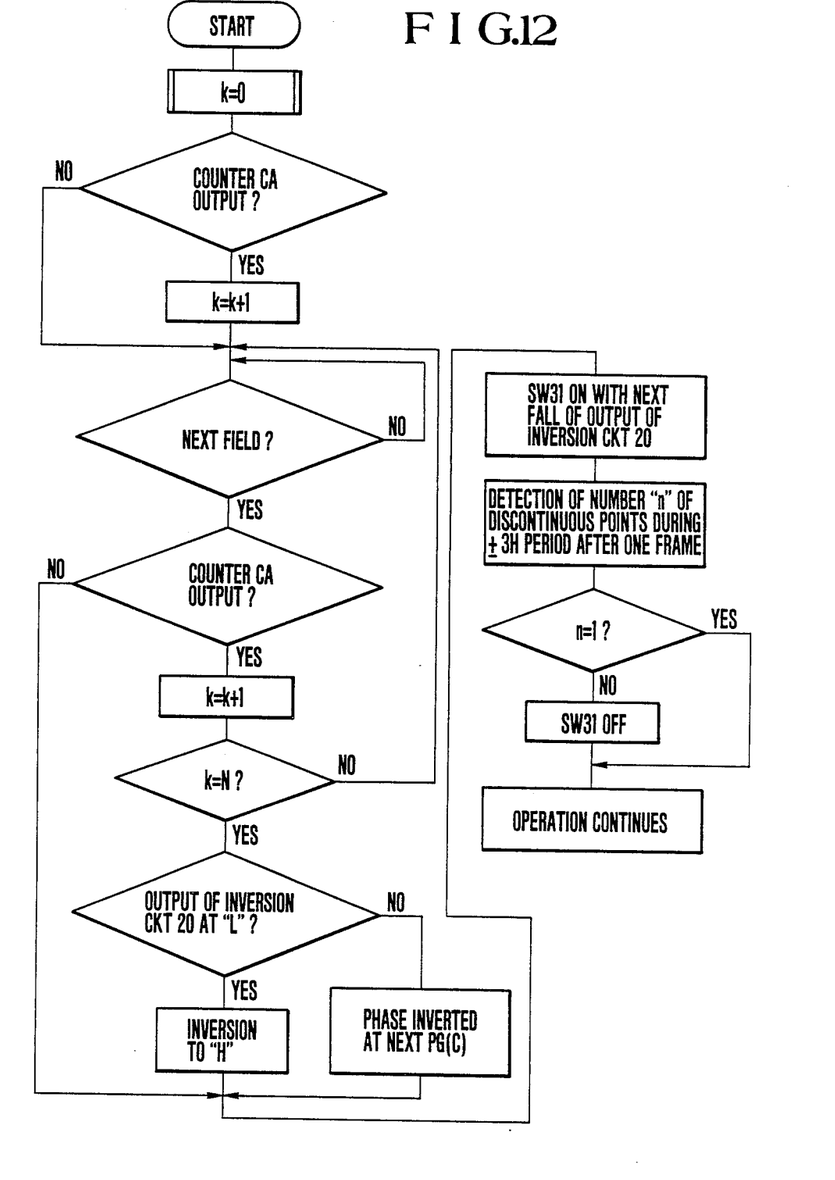
FIG. 12 is a flow chart showing the operation algorithm of the control circuit included in the apparatus shown in FIG. 11.

FIG. 12 is a flow chart showing the operation algorithm of the control circuit 35 of FIG. 11. In the same manner as in the case of FIG. 7, the flow chart starts from a point of time where the Q output (i) of the inversion circuit 20 and the Q output (f) of another inversion circuit 22 have come to have correct phases. After this point of time, at a next point of time t11 where the fall of the signal (i) takes place as shown in FIG. 10 (the phase of the switching control signal becomes discontinuous at that point of time), for example, the switch circuit 31 is turned on to bring the monostable multivibrator 32 into an unstable state for once. After termination of the unstable period (2v−3 H), again there comes a phase discontinuous point of the switching control signal. Then, within a period of ±3 H across the pulse (c), the control circuit 35 detects the output (m) of the retriggerable monostable multivibrator 29 and counts the number of occurrences of the fall of the output (m), that is, the number of the discontinuous points. Then, in case that this number n is not 1, it is determined that no reliable discontinuous point has exsisted within the above-stated ±3 H period due to a poor S/N ratio or some other reason. After the determination, the inversion timing of the inversion circuit 20 is determined according to the pulse signal (c) without performing the discontinuous point detecting operation any longer. In case of n=1, however, the output of the multivibrator 29 is determined to be indicative of an effective discontinuous point in synchronism with the timing of the recording track. After that, therefore, the phase inverting control over the switching control signal is performed by means of the output of the multivibrator 29.

The embodiment which is arranged as described above is capable of accurately inverting the phase of the switching control signal even in the event of a change in the generating phase of the signal PG and also in the event of deterioration of the S/N ratio of the line sequential signals in the neighborhood of the phase discontinuous point. Therefore, the line sequential signals can be always adequately rearranged into line simultaneous signals.

Further, the embodiment is preferably arranged to repeat the above-stated operation over again from the beginning in cases where the rotation of the magnetic sheet is extremely disturbed or where drop-outs arise in the line sequential signals over a long period. Such an arrangement can be made without any difficulty.

What is claimed is:

1. A video signal processing apparatus for processing video signals including line sequential signals which have a discontinuous point at intervals of a predetermined period, comprising:

(a) generating means for generating a periodic signal having a period related to a horizontal scanning period of said video signal;

(b) phase shifting means for shifting a phase of said periodic signal generated by said generating means, the phase shifting action being performed in a cycle related to said predetermined period;

(c) detecting means for detecting the kind of information included in said line sequential signals obtained during each horizontal scanning period of said video signal;

(d) control means for controlling the phase shifting action of said phase shifting means by using a signal of phase difference between an output signal of said kind of information detecting means and an output signal of said phase shifting means; and (e) rearranging means for rearranging said line sequential signals into line simultaneous signals by using a signal produced from said phase shifting means.

2. An apparatus according to claim 1, wherein said control means compares the phase of the output signal of said detecting means with the phase of the output signal of said phase shifting means to modulate a phase comparison circuit which outputs the phase difference signal.

3. An apparatus according to claim 2, wherein said control means further includes a circuit arranged to get statistics of the outputs of said phase comparison circuit produced within said predetermined period.

4. An apparatus according to claim 2, wherein said control means further includes a circuit which operates for shifting the phase of said periodic signal according to the output of said phase comparison circuit.

5. An apparatus according to claim 1, wherein said shifting means includes a circuit which is arranged to generate a square wave signal having a period related to said predetermined period; and a circuit which is arranged to invert the phase of said periodic signal by means of said square wave signal.

6. An apparatus according to claim 5, wherein said control means includes a circuit arranged to invert said square wave signal on the basis of said phase difference signal.

7. A video signal processing apparatus for processing video signals including line sequential signals which have a discontinuous point at intervals of a predetermined period, comprising:
- (a) first generating means for generating a first periodic signal having a period related to a horizontal scanning period of said video signal;
- (b) second generating means for generating a second periodic signal having a period related to said predetermined period;
- (c) designating means for designating specific periods by using said second periodic signal;
- (d) detecting means for detecting the kind of information included in said line sequential signals obtained during each horizontal scanning period of said video signal;
- (e) phase controlling means for controlling the phase of said first periodic signal on the basis of an output of said detecting means produced during said specific periods; and
- (f) rearranging means for rearranging said line sequential signal into line simultaneous signals by using said first periodic signal the phase of which is controlled by said phase controlling means.

8. An apparatus according to claim 7, wherein said specific periods are designated by said designating means for every period of said second periodic signal.

9. An apparatus according to claim 8, wherein one of said specific periods is integer times as long as one period of said first periodic signal.

10. An apparatus according to claim 7, wherein said control means includes a circuit arranged to detect a discontinuous point of the output signal of said detecting means.

11. An apparatus according to claim 10, wherein said control means includes a circuit arranged to invert the phase of said first periodic signal on the basis of the output of said detecting circuit.

12. An apparatus according to claim 11, wherein said control means further includes a circuit arranged to selectively supply to said inversion circuit either the output signal of said detecting circuit or a signal indicative of the period of said second periodic signal.

13. An apparatus according to claim 10, further comprising inhibiting means for inhibiting the operation of said designating means on the basis of the output of said detecting means.

14. An apparatus according to claim 13, wherein said inhibiting means includes a counter circuit which counts the number of discontinuous points of the output signal of said detecting means detected by said detecting circuit; and a cancelling circuit which, on the basis of a count value of said counter circuit obtained within one of said specific periods, cancels any specific period designated thereafter by said designating means.

15. A video signal processing apparatus for processing video signals including line sequential signals which have a discontinuous point at intervals of a predetermined period, comprising:
- (a) means for generating a first periodic signal having a period related to the horizontal scanning period of said video signal;
- (b) means for generating a second periodic signal having a period related to said predetermined period;
- (c) specific period designating means for designating specific periods by using said second periodic signal;
- (d) phase control means for controlling the phase of said first periodic signal during said specific periods;
- (e) phase inverting means for forcedly inverting the phase of said first periodic signal during each of said specific periods when the phase of said first periodic signal remains unchanged by said phase control means; and
- (f) rearranging means for rearranging said line sequential signals into line simultaneous signals by using said first periodic signal the phase of which is changed either by said phase control means or by said inverting means.

16. An apparatus according to claim 15, further comprising detecting means for detecting the kind of information included in said line sequential signals obtained during each horizontal scanning period.

17. An apparatus according to claim 16, wherein said control means includes a circuit which is arranged to control a timing for inverting the phase of said first periodic signal by using an output of said detecting means within said specific period.

18. A video signal processing apparatus for processing video signals including line sequential signals which have a discontinuous point at intervals of a predetermined period, comprising:
- (a) means for generating a first periodic signal having a period related to the horizontal scanning period of said video signal;
- (b) means for generating a second periodic signal having a period related to said predetermined period;
- (c) means for detecting the kind of information included in said line sequential signals obtained within each horizontal scanning period of said video signal;
- (d) phase shifting means for shifting the phase of said first periodic signal in a cycle related to said second periodic signal by selectively using either said second periodic signal or an output signal of said detecting means; and
- (e) rearranging means for rearranging said line sequential signals into line simultaneous signals by using an output signal of said phase shifting means.

19. An apparatus according to claim 18, wherein said phase shifting means includes a detecting circuit which is arranged to detect the discontinuous point of the output signal of said detecting means; a selective output circuit which is arranged to selectively produce an output signal of said detecting circuit or a signal indicative of the period of said second periodic signal; and a phase inverting circuit which is arranged to invert the phase of said first periodic signal at a timing related to a signal produced by said selective output circuit.

* * * * *